United States Patent [19]

Abu-Saud

[11] 3,811,775

[45] May 21, 1974

[54] POLARISCOPE FOR DETERMINING STRESS IN A TRANSPARENT MATERIAL

[75] Inventor: Munther Abu-Saud, Jeannette, Pa.

[73] Assignee: ASG Industries Inc., Kingsport, Tenn.

[22] Filed: June 21, 1972

[21] Appl. No.: 264,827

[52] U.S. Cl.............. 356/35, 356/34, 356/114, 356/115, 356/116, 356/239, 250/225
[51] Int. Cl. ......................................... G01b 11/18
[58] Field of Search....... 356/35, 34, 115, 239, 116, 356/114, 119; 250/225; 350/149

[56] References Cited
UNITED STATES PATENTS

| | | | |
|---|---|---|---|
| 1,874,217 | 8/1932 | Arberry | 356/35 |
| 3,082,664 | 3/1963 | Acloque | 356/35 |
| 3,158,675 | 11/1964 | Murray et al. | 250/225 X |
| 2,992,589 | 7/1961 | Williams | 356/33 |
| 3,124,637 | 3/1964 | Heitzer | 356/35 |
| 3,656,854 | 4/1972 | Bricker et al. | 356/239 |
| 3,446,977 | 5/1969 | Bateson | 356/116 |

Primary Examiner—Ronald L. Wibert
Assistant Examiner—Paul K. Godwin
Attorney, Agent, or Firm—Pennie & Edmonds

[57] ABSTRACT

A polariscope is described for detecting stresses in a transparent object. The polariscope comprises means for producing a beam of polychromatic plane polarized light, a condensing lens, an aperture, a quarter-wave retardation plate, analyzing means and a photocell. Changes in stress cause changes in the color and intensity of the light detected. Means are provided for scanning the polychromatic light beam back and forth in one direction across the transparent object that is being studied. Means are also provided for moving the transparent object in a direction transverse to the direction of the scanning light beam. The output of the photocell is applied through an amplifier to a chart recorder in order to produce a plot of the stresses in the object with respect to their position.

3 Claims, 1 Drawing Figure

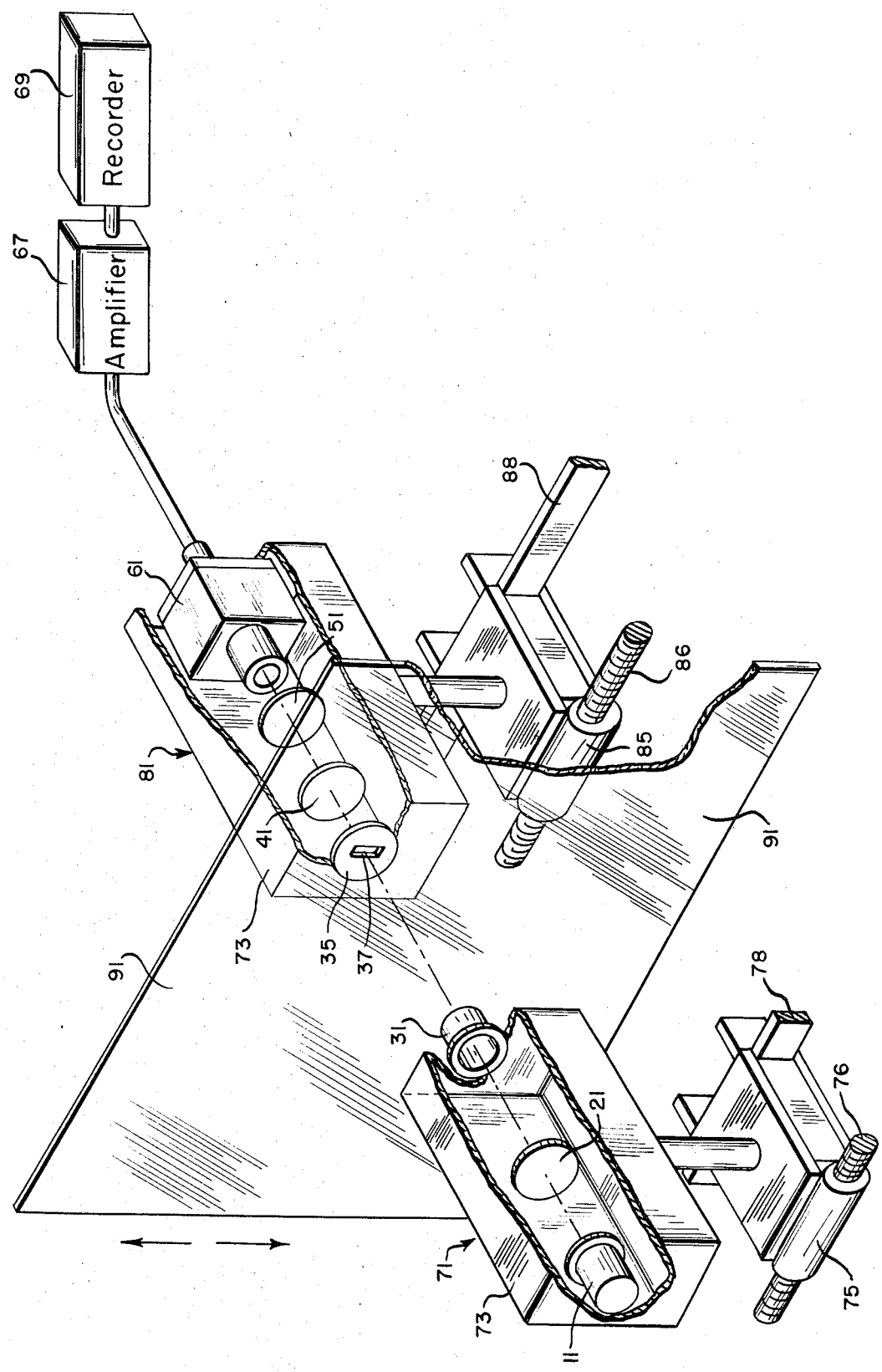

POLARISCOPE FOR DETERMINING STRESS IN A TRANSPARENT MATERIAL

SUMMARY OF THE INVENTION

This concerns a polariscope and, in particular, an automatic polariscope especially adapted for the inspection of transparent sheets to detect stresses therein.

This polariscope comprises means for producing a beam of polychromatic plane polarized light, a condensing lens, an aperture, a quarter-wave retardation plate, analyzing means and a photocell. The polariscope also provides means for scanning the polychromatic light beam across the transparent object by moving the light beam back and forth in one direction and by moving the object in a direction transverse to the direction in which the light beam is moved. Preferably, the output of the photocell is applied through an amplifier to a chart recorder in order to produce a plot of the stresses in the object with respect to their position.

As is well known in the art, the term quarter-wave retardation plate refers to an optical device that introduces a quarter-wave retardation between two components of the electric vector of electromagnetic radiation that passes through the plate. Because my invention is practiced with white light, a given retardation plate will have such a thickness as to produce a quarter-wave retardation for only one wavelength in the spectrum of light incident on it. Preferably, the quarter-wave plate that is used in my invention has a thickness such as to produce quarter-wave retardation for a wavelength at approximately the middle of the light spectrum incident on the retardation plate.

DETAILED DESCRIPTION OF THE DRAWING

Illustratively, apparatus used in practicing my invention comprises a source 11 of white light, a polarizer 21, a condensing lens 31, an aperture plate 35 in which there is a small aperture 37, a quarter-wave retardation plate 41, an analyzer 51, a photocell 61 and means 71 and 81 for supporting the foregoing optical elements and translating them in fixed, spaced-apart relationship. Illustratively, the apparatus also comprises a power supply and amplifier 67 for photocell 61, and a chart recorder 69 for recording the output of photocell 61. Means 71 and 81 for supporting and translating the optical elements of my invention are similar. Means 71 comprises mounting means 73 to which are secured light source 11, polarizer 21 and condensing lens 31. Typically, mounting means 73 is a light-tight box to which the various elements 11, 21 and 31 are secured by conventional devices. Mounting means 73 is supported on a screw shaft 76 and a rail 78. A threaded unit 75 secured to mounting means 73 engages screw shaft 76 and causes mounting means 73 to move on shaft 76 and rail 78 when shaft 76 is rotated. Elements 35, 41, 51, and 61 are similarly mounted in mounting means 83 and are caused to move by rotation of a screw shaft 86. To insure that the optical elements mounted in means 73 maintain a constant spaced-apart relationship with the optical elements mounted in means 83, screw shafts 76 and 86 are parallel, have the same pitch, and are driven from the same source (not shown).

My invention may be used to examine stresses in transparent objects, such as glass sheets. Preferably, such an object, depicted in the drawing as transparent sheet 91, is placed between condensing lens 31 and aperture plate 35 near the focus of lens 31. To examine transparent sheet 91 for stresses, white light is directed from source 11 through polarizer 21 to form a beam of polychromatic plane polarized light. This beam of plane polarized light is converged by condensing lens 31 onto a narrow region of transparent sheet 91. A portion of the light from transparent sheet 91 passes through slit 37 in aperture plate 35 and is incident on quarter-wave plate 41. Quarter-wave plate 41 produces a quarter-wave retardation for incident light on one wavelength and produces other retardations for all other wavelengths. The effect of this, as will be detailed below, is to alter the intensity of the different wavelength components of the light incident on photocell 61 in accordance with the stress pattern on sheet 91. Light from quarter-wave plate 41 is incident on analyzer 51. Analyzer 51 is oriented in known fashion to minimize the passage of light from unstressed portions of transparent object 91. If, however, transparent object 91 is stressed, some of the light incident on analyzer 51 passes therethrough and is incident on photocell 61.

The output of photocell 61 varies with the intensity and color of the light that is incident on it. When quarter-wave plate 41 produces quarter-wave retardation for light having a wavelength of approximately 5,700 Angstroms, the light that is incident on photocell 61 will appear purple when object 91 is free from stress. When transparent object 91 is compressed, the light incident on photocell 61 ranges from yellow to red. When transparent object 91 is subjected to a tensile stress, the light incident on photocell 61 ranges from light blue to dark blue. Moreover, the amplitude of the current in the signal from photocell 61 also varies with the nature of the stress on object 91. Thus, when oject 91 is under a compressive stress, the current signal is highest; when object 91 is under a tensile stress, the current signal is lowest; and when object 91 is free from stress, the output signal is between the foregoing extremes.

The output of photocell 61 may readily be recorded by applying the signal from photocell 61 to amplifier 67 and using the signal from amplifier 67 to control one coordinate of a writing pen in chart recorder 69. The output of photocell 61 as recorded on chart recorder 69 may be calibrated by comparing the output from the object being studied with the outputs that are recorded from objects that are known to contain no stress and from objects that contain predetermined amounts of stress.

Preferably, my invention is used to scan a transparent object for stresses. This is done by driving screw shafts 76 and 86 together to move mounting means 71 and 81 across transparent object 91. An appropriate shaft position indicator (not shown) on screw shaft 76 or 86 develops a signal representative of the position of mounting means 71 and 81 and this signal is applied to recorder 69 to control a second coordinate of the writing pen. Thus, a plot is obtained of the intensity recorded by the photocell as a function of the position of the photocell with respect to the transparent object.

Scanning in a second dimension may readily be accomplished by moving transparent object 91 in a direction that is not parallel to the direction in which mounting means 71 and 81 are moved. For example, object 91 may be moved perpendicular to the axes of shafts 76 and 86 as shown by the arrow in the drawing.

In practicing my invention, I have used conventional optical elements for polarizer 21, condensing lens 31, quarter-wave plate 41, and analyzer 51. The thickness of quarter-wave plate 41 was such as to produce a quarter-wave retardation for incident light of approximately 5,700 Angstroms wavelength. Light source 11 was a conventional 6 watt 110 volt pilot lamp. Slot 37 in aperture plate 35 was one-eighth inch wide and one-half inch high. Photocell 61 was a Farmer Electric Photocell Type A. Power supply 67 was manufactured by Simplator Products and provided a peak output of 325 milliamps at 90 volts D.C. Recorder 69 was an Esterline Angus Graphic Ammeter Model AW set for a range of 0 to 1.0 milliamps.

As will be obvious to those skilled in the art, the foregoing description of apparatus used in practicing my invention is only illustrative. Numerous other elements may readily be used in place of those described above. For example, quarter-wave plates may be used having thicknesses other than that specified and photocells may be used having different spectral responses. When different wave plates and photocells are used, the output of the analyzer and the photocell may differ from the example set forth in this application. However, procedures for calibrating the output will be apparent to those skilled in the art.

Under appropriate circumstances, certain elements described above need not be used. For example, when automated read out is not required, photocell 61, amplifier 67, and recorder 69 may be eliminated and stress patterns may be detected by a human observer simply by noting the color of light passed by analyzer 51. Similarly, the equipment for automatic scanning of the transparent object can be replaced by simple skids on which mounting means 73 and 83 may be slid manually. Other modifications within the spirit and scope of my invention will be apparent to those skilled in the art.

What is claimed is:

1. Apparatus for detecting stresses in a transparent object comprising:
   means for forming a beam of polychromatic plane polarized light;
   a lens for focusing said beam at said transparent object;
   a fixed quarter-wave retardation plate having such thickness as to produce quarter-wave retardation for light of a wavelength within the spectrum of light incident on it, said retardation plate being located in the beam of light from the transparent object;
   means for analyzing said beam of elliptically polarized light after it passes through the quarter-wave retardation plate, said means being oriented so as to pass substantially the minimum amount of light when said transparent object is unstressed; and
   means for supporting the means for forming the beam of polychromatic plane polarized light in constant spaced-apart relationship from the quarter-wave retardation plate and the analyzing means and for translating said supporting means across said transparent object.

2. The apparatus of claim 1 further comprising:
   a photocell in the path of light passed by the analyzing means; and
   recording means for recording the output of the photocell.

3. The apparatus of claim 1 further comprising an opaque plate bearing a transparent aperture, said plate being located adjacent the transparent object with the aperture in the path of the beam focused by the lens.

* * * * *